(12) United States Patent
Yokoyama et al.

(10) Patent No.: US 7,807,728 B2
(45) Date of Patent: Oct. 5, 2010

(54) METHOD FOR RECYCLING RECOVERED POLYCONDENSATION POLYMER

(75) Inventors: Hiroshi Yokoyama, Okayama (JP); Muneaki Aminaka, Okayama (JP); Ken Someya, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 11/793,494

(22) PCT Filed: Dec. 19, 2005

(86) PCT No.: PCT/JP2005/023275

§ 371 (c)(1),
(2), (4) Date: Jun. 21, 2007

(87) PCT Pub. No.: WO2006/068093

PCT Pub. Date: Jun. 29, 2006

(65) Prior Publication Data

US 2008/0146685 A1    Jun. 19, 2008

(30) Foreign Application Priority Data

Dec. 21, 2004 (JP) .............................. 2004-369397
Aug. 16, 2005 (JP) .............................. 2005-235816

(51) Int. Cl.
*C08J 11/04* (2006.01)
(52) U.S. Cl. .................. 521/40; 521/40.5; 528/480; 528/502 R; 528/502 C; 528/503; 422/195; 422/196; 422/197; 425/130; 264/37.1

(58) Field of Classification Search .................... 521/48, 521/48.5, 40, 40.5, 41, 42; 528/272, 271, 528/300, 301, 480, 502 R, 502 C, 503; 264/37.1; 425/130, 205; 422/129, 131, 133, 135, 245.1, 422/195, 196, 197
See application file for complete search history.

(56) References Cited

U.S. PATENT DOCUMENTS 3,110,547 A    11/1963  Emmert
4,138,374 A *   2/1979  Currie ........................ 521/48

(Continued)

FOREIGN PATENT DOCUMENTS

JP           48-8355          3/1973

(Continued)

OTHER PUBLICATIONS

English language abstract of Taiwanese Patent Publication No. 459004B, published on Oct. 11, 2001.

(Continued)

*Primary Examiner*—Ling-Siu Choi
*Assistant Examiner*—Frances Tischler
(74) *Attorney, Agent, or Firm*—Staas & Halsey LLP

(57) ABSTRACT

Disclosed is a method for recycling a recovered polycondensation polymer which comprises a process wherein a recovered polycondensation polymer is supplied in a molten state to a polymerizer having a porous plate, and then after ejecting the polycondensation polymer through pores of the porous plate, the polymerization degree of the polycondensation polymer is increased under a reduced pressure or in a reduced inert gas atmosphere while dropping the polycondensation polymer along a supporting body.

25 Claims, 1 Drawing Sheet

U.S. PATENT DOCUMENTS

| | | | |
|---|---|---|---|
| 5,530,086 A * | 6/1996 | Fuji et al. | 528/193 |
| 5,589,564 A * | 12/1996 | Komiya et al. | 528/196 |
| 5,968,429 A | 10/1999 | Treece et al. | |
| 6,265,526 B1 * | 7/2001 | Komiya et al. | 528/196 |
| 2003/0027941 A1 | 2/2003 | Sawaki et al. | |
| 2003/0134915 A1 * | 7/2003 | Scantlebury et al. | 521/48 |
| 2003/0176625 A1 | 9/2003 | Morhenn et al. | |
| 2004/0116642 A1 | 6/2004 | Ikeda et al. | |

FOREIGN PATENT DOCUMENTS

| | | |
|---|---|---|
| JP | 53-17569 | 2/1978 |
| JP | 58-96627 | 6/1983 |
| JP | 63-46089 | 9/1988 |
| JP | 4-58806 | 9/1992 |
| JP | 2003-119266 | 4/2003 |
| JP | 2003-147121 | 5/2003 |
| JP | 2004-224895 | 8/2004 |
| JP | 2004-323664 | 11/2004 |
| JP | 2005-2197 | 1/2005 |
| WO | 99/65970 | 12/1999 |
| WO | WO 02/40569 | 5/2002 |

OTHER PUBLICATIONS

Taiwanese Patent Office Action, mailed Mar. 5, 2008 and issued in corresponding Taiwanese Patent Application No. 09720123850.

International Search Report for PCT/JP2005/023275 mailed Mar. 20, 2006.

* cited by examiner

METHOD FOR RECYCLING RECOVERED POLYCONDENSATION POLYMER

CROSS REFERENCE TO RELATED APPLICATIONS

This patent application is based on, and claims priority benefit to PCT Application No. PCT/JP2005/023275 filed Dec. 19, 2005, Japanese patent application No. 2004-369397 filed Dec. 21, 2004, and Japanese patent application No. 2005-235816 filed on Aug. 16, 2005, the disclosures of which are incorporated herein by reference.

TECHNICAL FIELD

The present invention relates to a process for recycling a recovered polycondensation polymer.

BACKGROUND ART

A polycondensation polymer represented by polyethylene terephthalate resin (hereinafter sometimes referred to as "PET resin"), has excellent features such as heat resistance, weather resistance, mechanical resistance, and transparency. Using such features, PET resin has been widely used in fibers and magnetic tapes as well as beverage containers, preforms for manufacturing beverage containers, injection molded articles for various uses, and extrusion molded articles such as package films and sheets.

However, in molding such a polycondensation polymer, a large amount of debris is produced. For example, defective parts, which are not used as molded articles, obtained during a molding step such as burr of a molded article, runner and sprue generated in injection molding, deckle edge generated in molding sheet and film; and defective parts, which are not used as products, obtained in a manufacturing step of a molded article, such as alternative products in the middle of replacing existing products with the alternative products, defective bottles such as pinhole bottles, nonstandard products, purge products until the quality is stable, and resin pellets. Furthermore, in producing a polycondensation polymer, a large amount of a defective polycondensation polymer that is not used as a product is generated. Examples of such a defective polymer include alternative products in the middle of replacing existing products with the alternative products, nonstandard products, and purge products. Moreover, molded articles on market are recovered as recyclable products. It has been desired to develop a process for recycling these recovered products from a recent environmental protection point of view.

For example, attempts have been made to reuse a recovered resin by compounding a new polyester and a scrap polyester at a point of time during a polyester production step and returning the scrap component to a flow of the polyester production step (for example, see Patent Document 1).

However, a polycondensation polymer such as PET resin has a problem in that its polymer chain is cleaved once heat is applied thereto, decreasing in molecular weight. Also, a recovered resin decreases in molecular weight and thus low in physical properties. Therefore, it is not preferable to employ it again for its original use. For this reason, the resin thus recovered is merely used for food trays, which may be made of a relatively low-molecular weight material and requires less physical properties.

As one of techniques for continuous melt polymerization of esters, a method of conducting polymerization while dropping a prepolymer by gravity from the top of a polymerization reactor. For example, as a process for producing polyesters, there is a technique to supply a PET oligomer having an average degree of polymerization of 8 to 12 (corresponding to a limiting viscosity of 0.1 dl/g or less) at 285° C., drop it by gravity along a cylindrical metal net put perpendicular inside the reactor and conduct polymerization with a reduced pressure inside the reactor (see Patent Document 2) and as a process for producing polyamides or polyesters, there is a technique to conduct polymerization while dropping a polymer along a linear support put perpendicular inside a reactor (see Patent Document 3). See Patent Documents 4 to 7. However, according to the present inventors' study, it is revealed that even if the above techniques are used as such, it is not possible to obtain polyesters having a high degree of polymerization. Further, there is a problem that since oligomers ejected from a porous plate or the like are vigorously foamed to foul the surface of the porous plate or the inner walls of the reactor, so that the fouling is decomposed and modified to be mixed with the polymer during a long time operation and so deteriorates the quality of polyester products. Even if the scrap component having a quality lowered through a thermal history is returned to the flow during the polymerization step by these techniques, it is impossible to obtain polyesters having a high degree of polymerization and also the resulting polyesters are not practically applicable at all because of remarkably deteriorated hue of the product.

Furthermore, attempts have been made to reuse a recovered resin as a raw material by completely decomposing the resin into monomer units (for example, see Patent Document 8). However, the depolymerization of a resin into monomer units must be performed in supercritical conditions in an organic solvent and also requires a purification step of the crystallization solvent on recovered monomers. Therefore, cost inevitably increases.

In the circumstances, it has been desired to develop a simple and inexpensive recycling process for a recovered polycondensation polymer by increasing the molecular weight of the polymer.

[Patent Document 1] JP-B-63-46089
[Patent Document 2] JP-B-58-8355
[Patent Document 3] JP-A-53-17569
[Patent Document 4] U.S. Pat. No. 3,110,547
[Patent Document 5] JP-B-4-58806
[Patent Document 6] WO 99/65970 A
[Patent Document 7] JP-A-58-96627
[Patent Document 8] JP-A-2003-147121

DISCLOSURE OF THE INVENTION

An object of the present invention is to provide a process for recycling a recovered polycondensation polymer by polymerizing the polymer with high productivity at a low cost while keeping high quality.

The present inventors have conducted intensive studies with view toward solving the aforementioned problems. As a result, surprisingly, they have found that the aforementioned problems can be solved by polymerizing a recovered polycondensation polymer in appropriate conditions while dropping the resin along a support. Based on the finding, the present invention has been completed.

More specifically, the present invention is as follows.

(1) A process for recycling a recovered polycondensation polymer, comprising supplying the recovered polycondensation polymer in a molten state to a polymerization vessel having a porous plate, ejecting the polymer through pores of the porous plate, and increasing the polymerization degree of the polycondensation polymer under reduced pressure or in an inert gas atmosphere under reduced pressure while dropping the polymer along a support.

(2) The process according to item (1), wherein the recovered polycondensation polymer is ejected from the pores of the porous plate together with an unused polycondensation polymer and/or an intermediate polymer.

(3) The process according to item (1) or (2), wherein the recovered polycondensation polymer with an improved polymerization degree has a number average molecular weight of 20,000 to 100,000.

(4) The process according to any one of items (1) to (3), comprising continuously measuring the melt viscosity of the recovered polycondensation polymer or a mixture of the recovered polycondensation polymer with the unused polycondensation polymer and/or the intermediate polymer to be supplied to the polymerization vessel, and continuously adjusting the pressure reduction degree of the polymerization vessel, based on measurement results of the melt viscosity.

(5) The process according to any one of items (1) to (4), comprising a step of reacting the recovered polycondensation polymer or the mixture of the recovered polycondensation polymer with the unused polycondensation polymer and/or the intermediate polymer, with any amount of a molecular weight adjuster, prior to supplying the recovered polycondensation polymer or the mixture to the polymerization vessel.

(6) The process according to any one of items (1) to (5), wherein the recovered polycondensation polymer is a recovered polyethylene terephthalate resin and ejected from the pores of the porous plate at a temperature ranging from "a crystal melting temperature −10° C." to "the crystal melting temperature−60° C.".

(7) A process for producing a molded article characterized by comprising transferring the polymer recycled by the process according to any one of items 1 to 6 to a molding machine in a molten state and molding the polymer.

According to the process for recycling a recovered polycondensation polymer of the present invention, it is possible to increase the polymerization degree of a recovered polycondensation polymer with good productivity at a low cost while maintaining high quality.

BEST MODE FOR CARRYING OUT THE INVENTION

Figure 1:
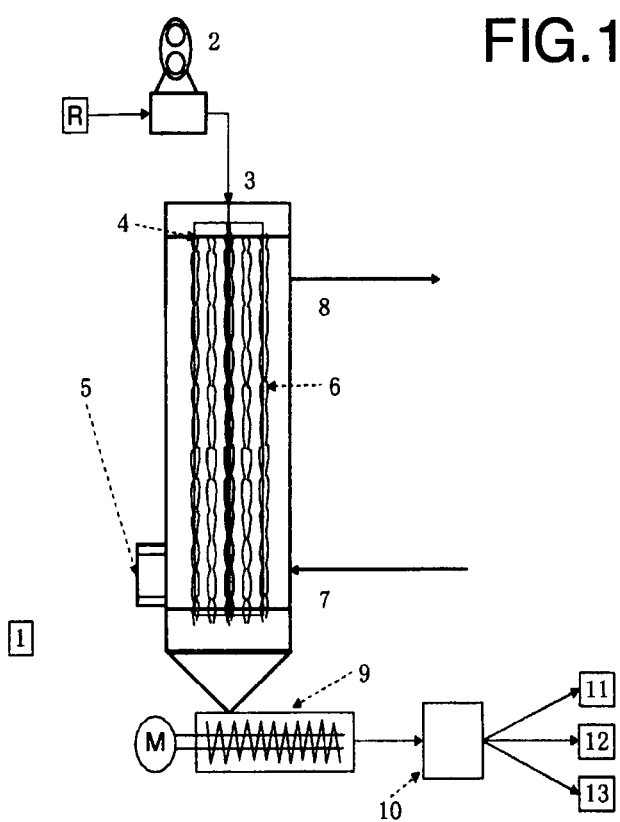
FIG. 1 is a schematic view of a polymerization vessel and molding machine used in the present invention.

The polycondensation polymer of the present invention refers to a polymer composed of at least one type of monomer having not less than two condensable functional groups, the monomers being bound via the binding of the functional groups. The monomers may be composed of an aliphatic hydrocarbon to which the functional groups are directly bound or composed of an aromatic hydrocarbon to which the functional groups are directly bound.

Examples of such a polycondensation resin (polymer) include polymers having a structure in which aliphatic hydrocarbon groups are bonded via the functional groups, such as an aliphatic polyester, aliphatic polyamide and aliphatic polycarbonate;

polymers having a structure in which an aliphatic hydrocarbon group and an aromatic hydrocarbon group are bonded via the functional groups, such as an aliphatic/aromatic polyester, an aliphatic/aromatic polyamide, and an aliphatic/aromatic polycarbonate; and polymers having a structure in which aromatic hydrocarbon groups are bonded via the functional groups, such as an aromatic polyester and an aromatic polyamide.

The polycondensation resin mentioned above may be a homopolymer or a copolymer, or alternatively, a copolymer having different bonds such as an ester bond, amide bond, and carbonate bond arranged at random or en bloc. Examples of such a copolymer include polyester carbonates and polyester amides.

Examples of aliphatic/aromatic polyester include a PET resin. The PET resin used in the present invention is preferably composed of ethylene terephthalate repeating units in a content of no less than 50% by mole. In other words, the PET resin may be composed of one or more other copolymer components in a content of less than 50% by mole.

Examples of such a copolymer component include monomers capable of forming an ester such as 5-sodium sulfoisophthalic acid, 3,5-dicarboxylic acid benzene-sulfonate tetramethyl phosphonium salt, 2,6-nephthalene dicarboxylic acid, 1,3-butanediol, 1,4-butandiol, neopentyl glycol, 1,6-hexamethylene glycol, 1,4-cyclcohexane diol, 1,4-cyclohexane dimethanol, isophthalic acid, oxalic acid, succinic acid, adipic acid, dodecanoic diacid, fumaric acid, maleic acid, and 1,4-cyclohexane dicarboxylic acid; and polyethylene glycol; polypropylene glycol; polytetramethylene glycol; and copolymers thereof.

The PET resin of the present invention may contain, other than, the PET resin, a ring-form or linear oligomer, a monomer such as dimethyl terephthalate (hereinafter simply referred to as "DMT"), terephthalic acid (hereinafter simply referred to as "TPA") and ethylene glycohol (sometimes simply referred to as "EG"); various types of additives; and other resins.

The present invention is directed to a process for producing a high-quality polycondensation polymer by supplying a recovered polycondensation polymer in a molten state to a polymerization vessel, thereby increasing a polymerization degree.

The recovered polycondensation polymer used herein refers to defective products including alternative products in the middle of replacing existing products with the alternative products and resin pellets generated in a polymerization step;

burr, runner, gate, sheet and film edge generated in a molding step of a polycondensation polymer;

a massive resin generated in a step from start-up to a stabilized state, and nonstandard molded articles generated;

defective products such as pinhole bottles generated in a production step;

containers recovered for recycling such as used PET bottle waste; and recycling flakes of used PET bottle waste produced by sorting, washing and shattering used PET bottle waste.

Since a polycondensation polymer such as PET resin is depolymerized by application of heat and reduced in molecular weight, a recovered resin product cannot be reused for its original purpose even if it is melted again. However, if a recovered polycondensation polymer reduced in molecular weight is polymerized to increase the molecular weight, the polymer thus obtained can be used as a product. In addition, this attempt is preferable from both economic and environmental points of view.

The present inventors have conducted studies under the aforementioned circumstances and found that a polycondensation polymer of a high polymerization degree can be obtained by supplying a recovered polycondensation polymer in a molten state to a polymerization vessel having a porous plate, ejecting the molten polymer from the pores of the porous plate, increasing a polymerization degree of the polycondensation polymer under reduced pressure or in an inert gas atmosphere under reduced pressure while dropping it along a support, and continuously taking out the resultant polymer from the polymerization vessel.

The temperature during polymerization performed in a polymerization vessel according to the present invention preferably ranges from "the crystal melting point of a recovered polycondensation polymer−10° C." to "the crystal melting point+60° C.".

In the case of recovered PET resin, the PET resin of a high polymerization degree can be obtained by supplying recovered PET resin to a polymerization vessel in a molten state, ejecting it from the pores of the porous plate at a temperature ranging from "the crystal melting point of the resin−10° C." to "the crystal melting point+60° C.", preferably from "the crystal melting point−5° C." to "the crystal melting point+40° C.", and further preferably, from "the crystal melting point+1° C." to "the crystal melting point+30° C.", increasing the polymerization degree of the resin under reduced pressure, while dropping along a support, and continuously taking out from the polymerization vessel.

In the present invention, when a recovered polycondensation polymer is introduced into a polymerization vessel, it is preferable that the polymer is sorted if necessary, shattered, washed, dried, melted and introduced into the polymerization vessel of the present invention. It is also preferable that the recovered polymer is crystallized before dried to avoid melt-solidification. To attain this, if necessary, an extruder and/or a preparatory melting vessel may be arranged upstream of the polymerization vessel of the present invention with a crystallization apparatus, sorting apparatus, shattering apparatus, washing apparatus, and dryer interposed between them. As the extruder, use may be preferably made of the one that melts and supplies a resin. An extruder may be appropriately chosen from those having a single screw, double screw, a rotatable screw in the same direction, and a rotatable screw different directions. As the dryer, use is preferably made of the one that can be removed a moisture content as much as possible to avoid a decrease of the polymerization degree in melting. More specifically, use may be preferably made of a dryer using hot-air flow or inert gas flow, or a vacuum dryer. As the temperature of a dryer, any temperature is acceptable as long as oxidation and heat deterioration can be avoided, and preferably 180° C. or less.

In particular, a low crystalline state of a recovered PET resin is developed by abruptly cooling when a molded article or a molten resin is taken out in some cases. In other cases, melt solidification of resin pieces is developed by abruptly heating when it is dried. When melt-fusion takes place, feeding of a resin by an extruder is inhibited. Therefore, the resin is preferably crystallized in advance by heating it to the melting temperature or less.

A recovered polycondensation polymer is supplied in a molten state from a preparatory melting vessel and/or an extruder to a polymerization vessel according to the present invention. If necessary, it may be supplied via a filter.

A recovered polycondensation polymer may be supplied singly to a polymerization vessel according to the present invention for recycling. Alternatively, a recovered polycondensation polymer may be supplied together with an unused polycondensation polymer and/or an intermediate polymer to a polymerization vessel according to the present invention, for recycling. The unused polycondensation polymer used herein refers to unused resin pellets that have not been used for molding since they were produced, or an unused polycondensation polymer in a molten state produced and taken out from a molten polymerization vessel. Furthermore, the intermediate polymer used herein refers to a polymer of the initial polymerization stage having a low polymerization degree compared to the polycondensation polymer used as a product, and may contain an oligomer and a monomer. A recovered polycondensation polymer can be mixed with these unused polymerization condensation polymer and/or an intermediate polymer, supplied to the preparatory melting vessel and/or extruder, and introduced into a polymerization vessel according to the present invention in a molten state.

Alternatively, use may be preferably made of a process for improving handleability and controlling the polymerization degree and productivity of a recycled product by reacting a recovered polycondensation polymer or a mixture of a recovered polycondensation polymer and an unused polycondensation polymer and/or an polymer intermediate polymer, with any amount of a molecular weight adjuster, in any step before supplying the recovered polycondensation polymer or the mixture to a polymerization vessel according to the present invention.

Next, a step of polymerizing a recovered polycondensation polymer in a polymerization vessel according to the present invention will be explained.

The polymerization degree of a recovered polycondensation polymer or a mixture of a recovered polycondensation polymer and an unused polycondensation polymer and/or an intermediate polymer suitable for supplying to a polymerization vessel according to the present invention can be defined by a melt viscosity when the viscosity is evaluated at a temperature of polymerization carried out in the polymerization vessel of the present invention, at a shear rate of 1000 (sec$^{-1}$). The melt viscosity preferably ranges from 60 to 100,000 poises. When the melt viscosity is set at 60 poises or more, it is possible to suppress vigorous foaming and scattering of an intermediate polymer ejected from pores of a porous plate of the polymerization vessel. When the melt viscosity is set at 100,000 poises or less, a reaction side-product can be efficiently removed out of the system, facilitating polymerization without a problem. More preferably, the melt viscosity ranges from 100 to 50,000 (poise), further preferably, 200 to 10,000 poise, and most preferably, 300 to 5,000 (poise). In the present invention, it is preferable that an intermediate polymer has such a relatively high viscosity. This is because a resin can be polymerized while containing a large amount of foams, with the result that the polymerization rate can be greatly increased.

When a recovered polycondensation polymer is PET resin, a polymerization degree preferably falls within the range of 0.40 to 1.20 dl/g in terms of an intrinsic viscosity [η], which is used generally for expressing viscosity.

In the present invention, to manufacture a recycled product in high quality, it is important to suppress a molten-state of the recovered polycondensation resin ejected from the pores of a porous plate from vigorous foaming and scattering in a polymerization vessel according to the present invention. When the recovered polycondensation polymer is ejected at the aforementioned temperature, scattering of the recovered polycondensation polymer caused by vigorous foaming can be suppressed and a polymerization reaction side produce is removed outside the system, with the result that a polycondensation reaction can be performed efficiently.

When the resin ejected from the pores of a porous plate is vigorously foamed and scattered, the scattered resin is adhered to and smears the mouth ring surface and wall surfaces of the porous plate for ejection. The attached resin, if it retains for a long time, is decomposed with heat and produces a colored low molecular weight material or a degradation product. If a desired resin is contaminated with such a material, the resin decreases in quality and fails to acquire a desired polymerization degree.

To prevent scattering of a resin (PET resin) caused by vigorous foaming, it is preferable that the intrinsic viscosity [η] of a recovered polymer that is to be supplied to a polymerization vessel according to the present invention, is adjusted to not less than 0.40 dl/g. On the other hand, to remove efficiently a polycondensation reaction side-product such as EG from the system and to drop the resin while maintaining proper foaming for improving the polymerization degree, it is desirable to reduce the intrinsic viscosity of the recovered resin. The intrinsic viscosity of the recovered resin is preferably 1.20 or less, further preferably 0.50 to 1.00 dl/g, and more preferably 0.60 to 0.90 dl/g.

To obtain high-quality PET while suppressing foaming by imparting an appropriate viscosity and while preventing coloration due to heat decomposition, it is preferable that the ejection temperature of the recovered PET resin is set at not more than "a crystal melting point+60° C.". On the other hand, to uniformly eject the molten resin from a porous plate and drop the resin along a support while maintaining a uniform molten state, the ejection temperature is preferably set at not less than "a crystal melting point of the recovered resin–10° C.", more preferably, from "the crystal melting point–5° C." to "the crystal melting point+40° C.", and further preferably from "the crystal melting point+1° C." to "the crystal melting point+30° C.". Generally, the crystal solidifying point of a polymer is considerably lower than the crystal melting point. In particular, the crystal solidifying point of a resin having a low crystallinity falls over several ten degrees. Since a polyethylene terephthalate resin does not have good crystallinity, it can be handled at a temperature lower by 10° C. from the crystal melting point.

Note that the crystal melting point is defined by a peak endothermic temperature due to melting of a crystal measured by an input compensation type differential calorimeter, Pyris 1 DSC ((trade name, manufactured by Perkin Elmer Inc.) in the following conditions. The peak temperature was determined by use of the analysis software attached thereto.

Measuring temperature: 0 to 300° C.
Temperature raising rate: 10° C./min.

The ejection temperature is preferably from "a crystal melting point–10° C." to "the crystal melting point+60° C.", more preferably, from "the crystal melting point–5° C." to "the crystal melting point+40° C.", and further preferably, from "the crystal melting point+1° C." to "the crystal melting point+30° C.". In particular, to reduce the content of impurities such as acetoaldehyde, polymerization is desirably performed at as a low temperature as possible.

The porous plate for use in ejecting a recovered polycondensation polymer is a plate-form member having a plurality of through-holes. The thickness of the porous plate is not particularly limited; however, generally ranges from 0.1 to 300 mm, preferably 1 to 200 mm, and further preferably, 5 to 150 mm. The porous plate must withstand the pressure given by a recovered polymer supply chamber containing molten-state polymer; at the same time, have a strength for supporting the weight of a support and recovered polymer that falls along the support, in the case where the support of a polymerization chamber is immobilized to the porous plate. It is also preferable that the porous plate is reinforced by a rib or the like.

The shape of pores of the porous plate may be selected generally from circular, ellipsoidal, triangular, slit-form, polygonal, and star shapes. The sectional area of a pore generally falls within the range of 0.01 to 100 $cm^2$, preferably 0.05 to 10 $cm^2$, and particularly preferably 0.1 to 5 $cm^2$. The porous plate may have a nozzle or the like connected to the pore(s). The interval between pores falls generally within the range of 1 to 500 mm, and preferably 25 to 100 mm in terms of the distance between the centers of pores. The pores of the porous plate may be through-holes or tubes attached thereto, and alternatively, a tapered form. It is preferable to set the size and shape of pores such that a pressure loss of a molten recovered PET resin, when it passes through the porous plate, falls within the range of 0.1 to 50 $kg/cm^2$.

The material of the porous plate is generally and preferably a metallic material such as stainless steel, carbon steel, hastelloy, nickel, titanium, chromium and other alloys.

Furthermore, it is preferable to set a filter in a channel for a molten-state recovered polymer at the upstream side of the porous plate. Foreign matter clogging the pores of the porous plate can be removed by the filter. The type of filter is appropriately set so as to remove foreign matter equal to and larger than pore sizes of the porous plate and so as not to be broken by a recovered polymer passing therethrough.

Examples of a process for ejecting a recovered polymer through such a porous plate, include a process for dropping a recovered polymer by use of a liquid head or its own gravity, and a process for pressurizing and extruding a polymer by a pump. Use may be preferably made of a process for extruding a polymer by a pump such as a measurable gear-pump in order to suppress quantitative variation of a falling recovered polymer.

The number of pores of the porous plate is not particularly limited and may be varied depending upon the conditions such as reaction temperature and pressure, the amount of a catalyst and the molecular weight range of the polymer to be polymerized. Generally, when a polymer is produced in an amount of, for example, 100 kg/hr, 5 to 105 pores are required.

The recovered polymer ejected from the pores of the porous plate must be polymerized under reduced pressure while dropping it along a support. At this time, it is preferable that there is a portion where foams are generated without being burst immediately upon generation. More specifically, foams are desirably generated at the place on which the resin falling along a support is landed. As Examples of such a support include a wire-form, chain-form or a lattice (grid)-form made of wire materials in combination, a cubic lattice-form made of wire material in the shape of a jungle gym, a flat or curved thin-film, a porous plate, and a tower formed by stacking regular fillers or irregular fillers.

To efficiently extract a polycondensation reaction side-product such as EG and also reduce the content of impurities such as acetaldehyde in a recycled polymer, it is preferable that the resin drops have a large surface area. For this reason, the support preferably has a wire-form, chain-form, lattice-form or cubic lattice form. To more efficiently extract a polycondensation reaction side-product such as EG, thereby increasing a polymerization rate, and further reduce the content of acetaldehyde in a recycled polymer, other than increasing the surface area, it is particularly preferable that a recovered polymer is dropped along a support having projections and depressions on the way on which a recovered polymer falls. This is because the polymer is actively stirred by the projections and depressions, thereby renewing the surface of the polymer. For this reason, the structure of the support is particularly preferably a chain form, cubic lattice form, and wire form having projections and depressions, that is, structural obstacles inhibiting the drop of a resin, on the way on which a resin falls. As a matter of course, it is one of the preferable approaches that these supports are used in combination.

The wire form used herein refers to a solid material having an extremely large ratio of the sectional area based (calculated from) on an average length of outer circumference of the section to the length in perpendicular to the sectional area. The sectional area is not particularly limited; however generally ranges from $10^{-3}$ to $10^2$ cm$^2$, preferably from $10^{-2}$ to $10^1$ cm$^2$, and particularly preferably, $10^{-1}$ to 1 cm$^2$. The shape of the section is not particularly limited; however, generally selected from circular, ellipsoidal, triangular, square, polygonal, star shape and others. The shape of the section may or may not change lengthwise. The wire may be a hollow body.

The wire may be made of a single filament or a plurality of filaments combined, for example, by twisting. The surface of the wire may be smooth, rough and bumpy in part. The material of wire is not particularly limited; however generally selected from stainless steel, carbon steel, hastelloy, titanium and the like. Various surface treatments such as plating, lining, passive-state processing, and acid washing may be applied to the wire, if necessary.

The lattice (grid) form used herein refers to a solid material made of wire-like filaments in the form of a lattice. The wire filaments used in combination may be straight or curved. The wire filaments may be mutually crossed at any angle. In a projection view of the lattice (grid) form material obtained by vertically projecting light to the lattice plane, the area ratio of the solid material and the space is not particularly limited; however generally falls within the range of 1:0.5 to 1:1,000, preferably 1:1 to 1:500, and particularly preferably, 1:5 to 1:100. The area ratio in the horizontal direction is preferably equal; however, that of the vertical direction is preferably equal or preferably the ratio of the space increases toward the bottom.

The chain-form used herein refers to a solid material formed by sequentially connecting the wire rings. The shape of the wire ring may be circular, ellipsoidal, rectangular and square. Wire rings may be connected one dimensionally, two-dimensionally, and three-dimensionally.

The cubic lattice form used herein refers to a solid material having a three-dimensional lattice form, such as a jungle gym, formed of wire-like filaments. The wire filaments may be straight or curved and mutually crossed at any angle.

The "wire form having projections and depression on the way on which resin falls" refers to a wire filament having rods having a circular or polygonal sectional shape attached in perpendicular to the wire filament or a wire filament having disk-form or circular form solid materials attached thereto. The difference between projections and depressions is preferably 5 mm or more. Specific examples of such a wire include a wire filament having disks attached at intervals of 1 to 500 mm such that the wire filament passes through the center of the disks each of which has a diameter larger by 5 mm than that of the wire filament and less than or equal to 100 mm and a thickness of 1 to 50 mm.

In a chain-form support, a cubic lattice form support and a wire form support having projections and depressions formed in a perpendicular direction to the way on and along which the polymer drops, the volume ratio of the solid portion and space of the support to be combined is not particularly limited; however, generally falls within the range of 1:0.5 to 1:10$^7$, preferably 1:10 to 1:10$^6$, and particularly preferably 1:10$^2$ to 1:10$^5$. The volume ratio in the horizontal direction is preferably equal, whereas the volume ratio in the vertical direction is preferably equal or the ratio of the space increases toward the bottom.

The number of supports, whether or not a single or plural, may be appropriately chosen depending upon the shape of the support. In the cases of a wire form and linearly extending chain form, the number of supports generally ranges from 1 to 100,000, and preferably 3 to 10000. In the case of lattice form, a two-dimensional structure such as a two dimensional chain-form, thin-film form, and porous plate form, the number of supports generally ranges from 1 to 1,000, and preferably 2 to 100. In the case of a three-dimensional structure such as a three-dimensional chain form, cubic lattice form, and a filler tower, the number of supports may be single or plural. In this case, whether a single support or a plurality of supports (by splitting) are used can be appropriately determined in consideration of the size of an apparatus and installation space, etc.

In the case of a plurality of supports, the supports are preferably arranged with an appropriate spacer interposed between them to avoid mutual contact of supports.

In the present invention, a recovered polymer is generally supplied from at least one pore of the porous plate to a single support. The number of pores can be appropriately selected depending upon the shape of the support. Alternatively, a recovered polymer passed through a single pore can be dropped along a plurality of supports. However, to obtain a resin having uniform quality by rendering the dropping conditions uniform, the number of supports along which the resin is dropped is preferably as small as possible. For this reason, most preferably, a recovered polymer is supplied from a single pore to a single support along which the resin (polymer) drops.

The position of a support is not particularly limited as long as a recovered polymer can drop along the support. The method of fitting a support to a porous plate is appropriately selected from the two cases: one is where a support is arranged to thread through a pore of the porous plate. The other is where a support is not arranged to thread through a pore but arranged to below a pore of the porous plate.

The recovered polymer passed through a pore can be dropped along a support. The falling of the polymer may start from a height ranging from preferably 0.5 to 50 m, further preferably, 1 to 20 m and more preferably, 2 to 10 m.

The flow rate of a recovered polymer to be passed through a pore is preferably $10^{-2}$ to $10^2$ L/hr per pore, and particularly preferably, 0.1 to 50 L/hr. If the flow rate falls within the range, the cases where the polymerization rate and productivity significantly decrease are successfully avoided.

The average time required until completion of dropping of a recovered polymer along a support preferably falls within the range of 10 seconds to 100 hours, more preferably 1 minute to 10 hours, further preferably 5 minutes to 5 hours, and particularly preferably 20 minutes to 3 hours.

In the present invention, it is necessary to perform polymerization under reduced pressure while a recovered polymer is dropped along a support. This is because a polycondensation reaction side-product such as EG generated with the progress of the reaction is efficiently removed from the reaction system, thereby facilitating polymerization. The reduced pressure used herein refers to a pressure lower than the atmospheric pressure. Generally, the reduced pressure is preferably 50,000 Pa or less, more preferably 10,000 Pa or less, further preferably 1,000 Pa or less, and particularly preferably, 100 Pa or less. The lowermost limit is not particularly limited; however, desirably 0.1 Pa or more, in consideration of the size (capacity) of an apparatus for use in reducing the pressure of the system.

Alternatively, as one of the preferably approaches, a small amount of inert gas having no adverse effect upon the reaction may be introduced to remove EG and volatile substances, such as acetaldehyde, generated in the system, by carrying them on the inert gas under reduced pressure.

The recovered polymer for use in the process for recycling a polymer according to the present invention may be a mixture of resins having different polymerization degrees in some cases. When the polymerization degree of the starting recovered polymer mixture is extremely one-sided, if the polymerization of the recovered polymers is continued in predetermined constant conditions, the polymerization degree of the resultant recycled product may vary depending upon the polymerization degrees of the starting recovered polymers. For this reason, to obtain a resin having uniform quality, it is preferable to change polymerization conditions employed for a polymerization vessel depending upon the polymerization degree of the starting material to be introduced into the polymerization vessel.

The polymerization conditions having an effect upon the polymerization degree of a recycled product include polymerization temperature, the reduction degree of pressure, and the feed rate of a recovered polycondensation polymer to a polymerization vessel. Of them, the reduction degree of pressure can be most preferably varied depending upon the introduced resin.

The polymerization degree of a molten resin to be supplied is desirably evaluated based on the melt viscosity thereof immediately upstream of a polymerization vessel. The melt viscosity is most preferably evaluated based on the voltage of a gear pump for feeding the resin in a molten state. Alternatively, a viscometer may be preferably installed immediately upstream of the polymerization vessel. It is desirable to control the reduction degree of pressure of a polymerization system to change it quickly depending upon the viscosity thus measured.

Furthermore, polymerization is preferably performed in an inert gas atmosphere under reduced pressure.

It has been conventionally considered that introduction of an inert gas into a polymerization vessel is performed to advantageously facilitate a polymerization reaction by reducing the partial pressure of a side-product generated during a polycondensation reaction, thereby shifting the equilibrium. However, since the amount of the inert gas to be introduced in the present invention may be extremely small, the effect of improving a polymerization rate due to the reduction of partial pressure is rarely expected. Therefore, conventional interpretation cannot fit for explaining the role of such an inert gas. Based on investigation, the present inventors surprisingly found, by observation, that the foaming phenomenon of a molten polymer on the support vigorously takes place by introduction of an inert gas into a polymerization vessel, dramatically increasing the surface area of the molten polymer and extremely improving the surface renewal state. Based on an unknown theory, it is estimated that the change of the inner state and surface state of the molten resin is a cause increasing a polymerization rate.

As an inert gas to be introduced, mention may be made of a gas having no effect upon a resin, such as coloration, degradation and decomposition. Preferable examples of such an inert gas include nitrogen, argon, helium, carbon dioxide and lower hydrocarbon gas, of course, including a gas mixture thereof. As an inert gas, nitrogen, argon, helium or carbon dioxide is more preferable. Of them, nitrogen is particularly preferable in view of availability.

The amount of an inert gas to be introduced in the present invention may be extremely small, and preferably fall within the range of 0.05 to 100 mg per gram of a resin taken from a polymerization vessel. When the amount of an inert gas is 0.05 mg or more per gram of a resin taken from a polymerization vessel, a sufficient foaming state can be obtained. As a result, a polymerization degree effectively increases. On the other hand, when the amount is 100 mg or less, the reduction degree of pressure can be more easily increased. The amount of an inert gas is more preferable set at 0.1 to 50 mg and particularly preferably 0.2 to 10 mg per gram of a resin taken from a polymerization vessel.

Examples of a process for introducing an inert gas include a process for directly introducing it into a polymerization vessel; a process for absorbing and/or incorporating an inert gas into a recovered polycondensation polymer in advance and then allowing the inert gas absorbed and/or incorporated to release from the recovered polycondensation polymer under reduced pressure, thereby introducing it into a polymerization vessel; and a process using these processes in combination.

Note that, the "absorbed" used herein refers to a state in which an inert gas is dissolved in a resin and not present in a gaseous state, whereas the "incorporated" used herein refers to a state of an inert gas present in the form of air bubbles. When an inert gas is present in the form of air bubbles, the smaller the air bubbles, the more preferable. More specifically, air bubbles preferably have an average size of 5 mm or less and more preferably 2 mm or less.

The site of a polymerization vessel through which an inert gas is directly introduced is desirably away from a porous plate and near a port from which a resin is taken out. Furthermore, it is desirable that the site is away from an exhausting line for a reduced pressure.

On the other hand, as a process for absorbing and/or incorporating an inert gas into a recovered polycondensation polymer in advance, mention may be made of a process using a known absorption apparatus such as a filler-tower form absorption apparatus, stacked-stage form absorption apparatus, and spray tower absorption apparatus, as is described in for example "chemical apparatus design/operation series" No. 2, revised, gas absorption, pages 49-54, (published by Kagaku Kogyosha Inc. on Mar. 15, 1981); and a process for introducing an inert gas under pressure into a feed pipe for a recovered polycondensation polymer in a molten state.

What is the most preferable is a process using an apparatus for absorbing an inert gas into a recovered polycondensation polymer melted under an inert gas atmosphere while the molten polymer is dropped along a support. In this process, an inert gas having a higher pressure than the inner pressure of a polymerization vessel is introduced into an apparatus for adsorbing the inert gas. The pressure of an inert gas is preferably 0.01 to 1 MPa, more preferably 0.05 to 0.5 MPa, and further preferably 0.1 to 0.2 Pa.

In either case, it is preferable that there is a portion at which foaming takes place when a resin is dropped along a support. More specifically, foams are desirably generated at the place on which the polymer (resin) falling along a support is landed. The state of foaming used herein refers to both states where bubbles burst and immediately disappear and where bubbles are maintained.

The temperature for polymerizing a recovered polycondensation polymer while dropping along a support ranges from "the crystal melting point of the polycondensation polymer−10° C." to "the crystal melting point+60° C.". In the case where PET resin is used as the recovered polycondensation polymer, the temperature ranges more preferably from "the crystal melting point−5° C." to "the crystal melting point+40° C.", further preferably, "the crystal melting point+1° C." to "the crystal melting point+30° C.". When the temperature is "the crystal melting point−10° C." or more, the resin can easily and stably fall without significantly increasing the viscosity of the resin or solidifying on the way on which the resin falls. On the other hand, when the temperature is "the crystal melting point+60° C." or less, a recycled product having high quality can be easily obtained while suppressing coloration due to heat decomposition. The temperature of a resin in dropping, preferably falls within the range mentioned above and differs within 20° C. from the temperature of the resin (polymer) ejected from a porous plate. The difference is more preferably within 10° C., particularly preferably within 5° C., and most preferably zero, indicating the same temperature as the ejection temperature. Such a temperature can be attained by accurately controlling the temperature of a heater or jacket arranged on the wall of a polymerization vessel covering a support and/or a heater or a hot medium added to the interior of a support.

In the present invention, mention may be made of a process comprising supplying a recovered polycondensation polymer continuously, in a molten state, from a raw material supply port to a polymerization vessel, performing polymerization while dropping the molten polymer ejected from pores of a porous plate along a support, and taking out the whole amount of the resin landed continuously from the polymerization vessel; and a process comprising circulating part of the landed polymer and returning again to a step of polymerizing the resin while dropping the resin along the support. Of them, the process comprising the step of taking out the whole amount of resin landed is rather preferable. In the process comprising a step of circulating the landed resin and back again to a step of polymerizing the resin while dropping the resin along the support, heat decomposition must be avoid in a liquid storage portion for storing the landed resin and a circulation line. Therefore, the time and temperature of the resin retaining in these places are preferably reduced.

The number average molecular weight of a recycled product improved in polymerization degree and produced from a recovered polycondensation polymer by a recycling method according to the present invention is preferably 20,000 or more in view of mechanical properties of a molded body formed from the recycled product, preferably 100,000 or less in view of processability in molding, particularly preferably 22,000 to 50,000, and more particularly 24,000 to 45,000 in view of quality of a recycled product such as mechanical properties, hue and impurity content.

Furthermore, difference in polymerization degree of resin products is preferably small.

In a starting material for forming a molded article having stable quality, a value of Mw/Mn of the resin mixture, which is prepared by taking the same amount of 10 samples from one lot of products at random, is preferably 2.6 or less, further preferably 2.4 or less, and most preferably 2.2 or less.

A recovered polycondensation polymer increased in polymerization degree can be used directly in a molten state or once formed into pellets and then melted again for use in molding.

In the case of pellets, the pellets are desirably formed with a slight loss and extruded uniformly by an extruder. To obtain such pellets, the molten polymer taken out from a polymerization vessel is preferably extruded in strand form or sheet form, placed into a cool medium such as water to cool, and thereafter cut into pellets. The temperature of the cool medium is preferably 60° C. or less, more preferably 50° C. or less, and further preferably 40° C. or less. As a cool medium, water is preferably in view of economy and handling convenience. From this, the temperature of the cool medium is 0° C. or more. Cutting of the resin into pellets is preferably performed within 120 seconds after the resin is extruded and after the temperature is cooled to 100° C. or less.

A recycling process by a molten polymerization process according to the present invention is advantageous over a process for recycling a recovered polymer by increasing polymerization degree by solid phase polymerization. This is because not only a step of forming pellets from a recovered polycondensation polymer is omitted but also time and energy required for polymerization can be reduced. Furthermore, a recycled product has numerous advantages over the one obtained by the solid phase polymerization process. For example, the amounts of contaminants such as unfused substances during a modeling step and fine powder called fisheye causing a molding failure, are low. The obtained pellets have a low degree of crystallinity compared to those recycled by the solid phase polymerization process, so that the deterioration of polymerization degree due to heat generation caused by shearing during a molding step and the amount of heat decomposition product such as acetaldehyde are low. On the other hand, it is extremely difficult to increase the polymerization degree of the recovered polycondensation polymer and quality such as hue of the polymer decreases in the conventional molten polymerization technique. Therefore, it has been difficult to produce a recycled polymer excellent in quality like in the present invention.

A recycled polymer increased in polymerization degree by a polymerization process according to the present invention is used for molding. At this time, it is important to perform molding while suppressing a decrease of polymerization, coloration due to heat decomposition, and generation of volatile low molecular weight impurities. To attain this, it is preferable that a recycled polymer is transferred in a molten state from a polymerization vessel to a molding machine without solidifying and then subjected to melt molding. The "molten state" refers to a melt and flowable state of a resin attained by heat application. At this state, the viscosity of the resin is approximately 500,000 Pa·s or less.

In the present invention, a recycled polymer excellent in quality can be manufactured by the polymerization process mentioned above. In addition, a high-quality molded article, which is an object of the present invention, can be manufactured with high productivity by molding the recycled polymer while maintaining the excellent equality without solidifying. Combination of a recycling process by a melt-polymerization process according to the present invention with a process for molding a recycled polymer without solidifying at any moment is advantageous over a process of recycling a polymer increased in polymerization degree by a solid-phase polymerization process, since not only a step of palletizing a recycled product can be omitted, but also time and energy required for polymerization can be reduced. In addition, a step of drying pellets before molding and a step of melting the pellets again for molding are not required. As a result, energy can be saved and decomposition of a resin can be prevented.

When the temperature during transferring and molding of a resin is not less than a crystal melting temperature−10° C., a resin can be easily and stably transferred and molded without a significant increase of viscosity and solidification. On the other hand, when the upper limit of the temperature is a temperature higher by 60° C. than a crystal melting temperature, it is easy to obtain a high quality PET molding product while suppressing coloration due to heat decomposition and generation of low molecular weight volatile impurity. The temperature is preferable higher by 1 to 40° C., more preferably higher by 5 to 30° C., and particularly preferably higher by 10 to 20° C. than the crystal melting point of a recycle polymer. Such a temperature can be attained by appropriately controlling the temperature of a heater or jacket covering a transfer pipe, a transfer pump, and a molding machine.

Furthermore, the time is preferably within 40 minutes, more preferably within 20 minutes, and particularly preferable within 10 minutes. The shorter the time, the more preferable. Note that, the "time" used herein refers to a period from discharge of a molten resin from the discharge pump of a polymerization vessel to cooling of the molten resin to a crystal melting temperature of the resin or less in a molding machine or outside the molding machine. When a resin is continuously circulated through a pipe or the like, an average time calculated from the volume of a pipe and the flow rate of the resin can be employed. In the case where the time changes, the operation can be performed within the aforementioned time.

The present invention includes the case where additives such as a stabilizing agent, (crystal) nucleating agent, pigment are added if necessary by a single screw or double screw kneader placed between a polymerization vessel and a molding machine in the conditions of the aforementioned temperature and time.

The present invention includes the case where various types of additives such as a delustering agent, thermostabilizer, flame retardant, antistatistic agent, defoaming agent, color adjuster, antioxidant, UV-ray absorbing agent, crystal nucleating agent, whitener, and impurity trapping agent may be copolymerized or added if necessary. These additives may be added at any time.

In particular, a stabilizer is preferably added in the present invention. In the case of a recovered polycondensation polymer is PET resin, a penta valent and/or tri valent phosphorus compound and hindered phenolic compound are preferable. The addition amount of such a phosphorus compound is preferably 2 to 50 ppm and more preferably 10 to 200 ppm in terms of a weight ratio of phosphorus element contained in PET. As an example of such a phosphorus compound, use may be preferably made of trimethyl phosphite, phosphate, and phosphorous acid. Such a phosphorus compound is preferably used since it suppresses coloration of PET resin and has the effect of a crystal-nucleating agent.

The hindered phenolic compound is a phenolic derivative having a sterically hindered substituent at a position in the vicinity of a phenolic hydroxide group, in other words, a compound having one or more intramolecular ester bonds. The addition amount of such a hindered phenolic compound is preferably 0.001 to 1% by weight, and more preferably, 0.01 to 0.2% by weight relative to the PET resin obtained.

Examples of such a hindered phenolic compound include pentaerythritol tetrakis(3-(3,5-di-tert-butyl-4-hydroxyphenyl)propionate), 1,1,3-tris(2-methyl-4-hydroxy-5-tert-butylphenyl)butane, Octadecyl-3-(3,5-di-tert-butyl-4-hydroxyphenyl)propionate, and N,N-hexamethylene bis(3,5-tert-butyl-4-hydroxyhydrocinamide). As a matter of course, a stabilizer for these compounds may be preferably used.

The stabilizer may be added in any stage from the beginning to a molding step. A phosphorus compound is preferably added in the beginning of a polycondensation reaction and a hindered phenolic compound is added in the beginning of a polycondensation reaction or after a polymerized resin is taken out from a polymerization vessel.

In the present invention, it is further preferable to add a crystal-nucleating agent. As an example of such a nucleating agent, use may be preferably made of a phosphorus compound, an organic acid metal salt, and a powder of a resin such as PET and others. The addition amount of a nucleating agent to PET is preferably 2 to 1,000 ppm, and more preferably, 10 to 500 ppm. Specific examples include phosphates such as sodium 2,2'-methylene bis(4,6-di-t-butylphenyl)phosphate, and sodium bis(4-t-butylphenyl)phosphate, sorbitols such as bis(p-methylbenzylidene)sorbitol, and metal element containing compounds such as bis(4-t-butyl benzoic acid)hydroxyl-aluminium. Particularly, in manufacturing a preform of a bottle formed by thermal crystallization of the mouth portion with heat, a crystal-nucleating agent is preferably used since it accelerates crystallization, thereby reducing the temperature of thermal crystallization.

In one of preferable methods of the present invention, a trapping agent for low molecular weight volatile impurities is added. As the trapping agent, use may be made of a polymer or an oligomer of a polyamide and polyester amide, a low molecular weight compound having an amide group and an amine group. Specific examples include polymers such as polyamides, for example, nylon 6.6, nylon 6, and nylon 4.6 and polyethylene imines; a reaction product between N-phenyl benzene amine and 2,4,4-trimethyl pentene; and Irganox 1098 and Irganox 565 (registered trademark) manufactured by Ciba Speciality Chemicals Inc. These trapping agents are preferably added in the stage where a resin is taken out from a polymerization vessel and transferred to a molding machine.

When a resin taken from a polymerization vessel is transferred to a molding machine through a pipe, heating the pipe by a heater or jacket and maintaining the pipe warm are preferable in view of transferring a molten resin. The temperature for heating and maintaining the pipe is preferable 230 to 300° C. and further preferably 240 to 280° C.

Next, a preferable polymerization vessel used in the present invention will be exemplified and explained with reference to the accompany drawings.

FIG. 1 shows a polymerization vessel for carrying out a method according to the present invention. A recovered polycondensation polymer R such as PET resin is fed in a molten state from a raw material supply port 3 into a polymerization vessel 1 by way of a transfer pump 2, introduced into the interior of the polymerization vessel through a porous plate 4 and falls along a support 6 (a falling resin is also shown). A viscometer is arranged upstream of the raw material supply port 3. The interior of the polymerization vessel is controlled at a reduced pressure corresponding to the viscosity measured by the viscometer. A gas such as EG distillated from a recovered PET resin and an inert gas such as nitrogen optionally introduced from a gas supply port 7 are exhausted from an exhausting port 8 for reducing pressure. The polymer produced is discharged from a discharge port by a discharge pump 9. The polymerization vessel 1 is heated and maintained warm by a heater or a jacket.

The interior of the polymerization vessel is controlled at a predetermined reduced pressure. A gas such as EG distilled from a recovered PET resin and an inert gas introduced are discharged from exhausting port 8 for reducing pressure. The polymer produced is continuously discharged from the discharge port by the discharge pump 9, fed through a transfer pipe and a distributor 10 to injection molding machines A, B, C (11, 12, 13), in which the polymer is molded. The transfer pump 2, polymerization vessel 1, discharge pump 9, transfer pipe and distributor 10 are heated and maintained warm by the heater or the jacket.

Figure 2:
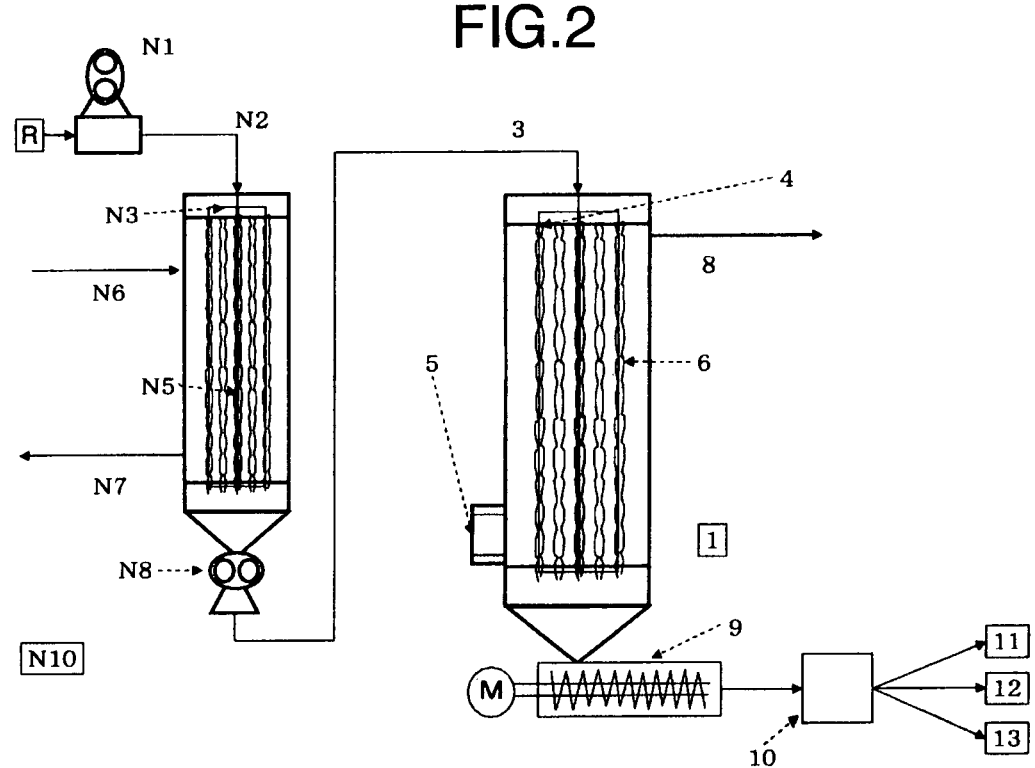
FIG. 2 is a schematic view of another polymerization vessel and molding machine used in the present invention.

FIG. 2 shows a polymerization vessel for carrying out a method according to the present invention in the case where an inert gas absorption apparatus is used. A recovered polycondensation polymer R such as a recovered PET resin is fed from a raw material supply port N2 to an inert gas absorption apparatus N10 via a transfer pump N1, passed through a porous plate N3, introduced into the interior of the inert gas absorption apparatus N10, and falls along a support N5 (a falling resin is also shown). The interior of the inert gas absorption apparatus is controlled at a predetermined reduced pressure by an exhausting port N7 for reducing pressure. The recovered PET resin absorbs an inert gas such as nitrogen gas introduced from an inert gas introduction port N6 while falling, supplied to the polymerization vessel 1 from the raw material supply port 3 by way of a discharge/transfer pump N8, and introduced into the interior of the polymerization vessel through the porous plate 4 and falls along the support 6 (a falling resin is also shown). The interior of the polymerization vessel is controlled at a predetermined reduced pressure. EG produced as a side-product is exhausted from the exhausting port 8 for reducing pressure. The polymer produced is discharged from a discharge port by the discharge pump 9. The polymerization vessel 1 is heated and maintained warm by the heater or the jacket.

A polymer resin is continuously discharged by the discharge pump 9, fed through a transfer pipe and a branch switching valve 10 to molding machines A, B, C (11, 12, 13), in which the polymer is molded. Three or more molding machines may be connected.

In either method, the resin falling along a support and landing at the lower portion of the polymerization vessel is discharged from the discharge port by the discharge pump. At this time, the amount of the resin accumulated at the lower portion of the polymerization vessel is preferably as small and constant as possible. In this manner, the coloration and decrease in polymerization degree due to heat decomposition can be suppressed and qualitative variation of the obtained resin can be easily suppressed. The accumulation amount of a resin can be controlled by adjusting a liquid amount fed by the transfer pump 2 and discharged by the discharge pump 9 by monitoring the accumulation amount through an observation window 5 or monitoring the accumulation amount by a level meter of a capacitance type.

The polymerization vessel used in the present invention may have, but not particularly require, a stirrer at the bottom. Accordingly, a rotation driving part may be removed from the polymerization vessel, with the result that polymerization can be performed in the airtight conditions under high vacuum. Since the rotation driving part of the discharge pump is covered with the resin to be discharged, the polymerization vessel is significantly excellent in sealing effect compared to that having a rotation driving part.

The process of the present invention can be performed in a single polymerization vessel and may be performed in two or more polymerization vessels.

Furthermore, a single polymerization vessel is longitudinally or laterally divided into multiple portions and used as a multiple stage polymerization vessel.

In the present invention, a step of increasing the molecular weight of a recovered polycondensation polymer such as a recovered PET resin so as to acquire a desired high polymerization degree may be performed exclusively by a polymerization process while dropping the resin passed through the pores of a porous plate, along a support; however may be preferably carried out in combination with other polymerization processes performed, for example, in a stirred polymerization vessel and a transverse stirred polymerization vessel. Furthermore, in the case where a recovered polycondensation polymer is supplied together with an unused polycondensation polymer and/or an intermediate polymer to the polymerization vessel of the present invention to form a recycle product, the unused polycondensation polymer and/or the intermediate polymer may be produced by another polymerization process using, for example, a stirred polymerization vessel or a transverse stirred polymerization vessel.

Examples of the transverse stirred polymerization vessel include polymerization vessels having a screw, independent vane, single screw, and double screw, more specifically, a polymerization vessel described in "Research Report from Research Group of Reaction Engineering: Reactive processing Part 2", chapter 4. (published by the Society of Polymer Science, Japan, 1992).

As the stirred polymerization vessel, use may be made of any one of the stirring vessels described in, for example Chemical Apparatus Handbook, chapter 11 (edited by the Society of Chemical Engineers, Japan, 1989). The shape of the vessel is not particularly limited and vertical and transverse cylindrical vessels may be used in general. The shape of a stirring vane is not particularly limited and a paddle shape, anchor shape, turbine shape, screw shape, ribbon shape, and double vanes may be employed.

A step of producing an unused polycondensation polymer and an intermediate polymer from a raw material may be performed in a batch system or a continuous system. In the batch system, the whole amounts of raw materials and reacting substances are placed in a reaction vessel. After a reaction is performed for a predetermined time, the whole amount of the reaction mixture is transferred to a next reaction vessel. On the other hand, in the continuous system, raw materials and reacting substances are continuously supplied to each of the reaction vessels and a reaction product is continuously discharged. The continuous system is preferable to obtain a large amount of a recycled polymer uniform in quality.

A material for a polymerization vessel used in the present invention is not particularly limited and generally selected from stainless steel, nickel, and glass lining, etc.

A process for transferring a recycled polymer obtained through polymerization to a molding machine is not particularly limited; however, generally, a means such as a gear pump and an extruder is used. The transfer of the polymer to the molding machine may be continuously or intermittently performed. In either case, transfer and molding must be performed within the predetermined time as mentioned above. In the case of intermittent transfer, discharge of a polymer from a polymerization vessel can be intermittently performed. However, as shown in FIG. 1, a resin is discharged continuously from a polymerization vessel and intermittently transferred to two or more molding machines (three machines in the figure) by sequentially switching transfer pipes in combination with a distributor 10 arranged between the polymerization vessel and the molding machines. Besides these, known apparatuses such as an apparatus composed of a reservoir and a piston, and a machine called an accumulator for temporarily storing a resin may be preferably arranged.

The molding machine used in the present invention refers to an apparatus for forming a molten resin into a predetermined shape. Examples of such a molding machine include an extruder, injection-molding machine, and blow-molding machine. Examples of a molded article formed by such a molding machine include bottles, preforms of bottles, films, sheets, tubes, rods, fibers and injection molded articles of various shapes. Of them, the present invention is suitably applied to form preforms of beverage bottles. This is because a beverage bottle needs to have excellent strength and transparency, and, in the case where a recovered polycondensation polymer is PET, such a bottle is strongly demanded to be produced with reduced low molecular weight volatile impurities, which are represented by acetaldehyde and may have an adverse effect upon taste and odor of the content of the bottle, and with high productivity.

EXAMPLES

The present invention will be explained by way of Examples.

Major measurement values shown in Examples were determined as follows.

<Measurement Method>

(1) Intrinsic Viscosity [η]

Intrinsic viscosity [η] was measured by Ostwald viscometer. More specifically, intrinsic viscosity was obtained by extrapolating the ratio of specific viscosity $\eta_{sp}$ (in o-chloro phenol at 35° C.) to concentration C (g/100 mL), $\eta_{sp}/C$, to concentration of Zero in accordance with the following equation:

$$[\eta] = \lim_{c \to 0} (\eta_{sp}/C).$$ [Formula 1]

(2) Crystal Melting Point

The crystal melting point was measured by an input compensation type differential calorimeter (trade name: Pyris 1 DSC, manufactured by Perkin Elmer Inc.) in the following conditions. The value of an endothermic peak derived from melting of a crystal was specified as a crystal melting point. The peak value was determined by use of the analysis software attached thereto.

Measuring temperature: 0 to 300° C.
Temperature raising rate: 10° C./min.

(3) The Amount of Carboxyl Group at Polymer End

A sample (1 g) was dissolved in 25 ml of benzyl alcohol. Thereafter, 25 ml of chloroform was added to the resultant mixture, and subjected to titration with a solution of 1/50N potassium hydroxide in benzyl alcohol. The amount of a carboxyl group was obtained by assigning a titration value $V_A$ (ml) and a value $V_0$ of a blank where no PET is used, to the following equation:

The amount of carboxyl group (meq/kg)=$(V_A-V_0) \times 20$.

(4) Acetaldehyde Content (Water Extraction Method)

Samples cut into small pieces was subjected to frost shattering under cooling by liquid nitrogen in a 6700 freezer mill (trade name, a frost shattering machine manufactured by SPEX) for 3 to 10 minutes to prepare a powder having grain sizes of 850 to 1,000 μm. The powder (1 g), was added together with 2 ml of water to a glass ample tube. After the air of the tube was replaced with nitrogen, the tube was sealed tight and heated at 130° C. for 90 minutes to extract impurities such as acetaldehyde. After cooling, the ample tube was opened and subjected to gas chromatographic analysis by use of GC-14B (trade name, Gas Chromatograph) manufactured by Shimadzu Corporation in the following conditions:

Column: VOCOL (60 m×0.25 mmφ×film thickness 1.5 μm)

Temperature conditions: maintain at 35° C. for 10 minutes, increase temperature to 100° C. at a rate of 5° C./minute, and thereafter increase to 100 to 220° C. at a rate of 20° C./minute Temperature of inlet: 220° C.

Injection method: Sprit method (sprit ratio=1:30), inject 1.5 μl

Measurement method: FID method (5) Hue (L Value, b Value) of a Resin Evaluated in the Form of Solution A sample (1.5 g) was dissolved in 10 g of 1,1,1,3,3,3,-hexafluoro-2-propanol and subjected to analysis in accordance with the permeability method using UV-2500PC (trade name, UV ray-visible light spectrophotometer) manufactured by Shimazu Corporation. The results were evaluated by use of the analysis software attached thereto.

(6) Molecular Weight Distribution

To evaluate variation of the polymerization degree of a resin product with time, a sample was taken every 30 minutes and dissolved in an eluent, 1,1,1,3,3,3,-hexafluoro-2-propanol (in which 5 mmol of sodium trifluoro acetate is dissolved) in a concentration of 1.0 mg/ml to prepare a solution. In Examples and Comparative Examples below, polymerization was respectively continuously performed for 5 hours or more. Of the sample solutions prepared as mentioned above, 10 solutions were arbitrarily chosen and mixed to prepare a solution mixture, which was subjected to analysis using IILC-8020GPC (Gel permeation chromatography) manufactured by Tosoh Corporation in the following conditions. The analysis results were evaluated by use of the analysis software attached thereto.

Column: HFIP-606M+HFIP-603 manufactured by Shodex
Column temperature: 40° C.
Injection amount: 30 μl
Measurement method: RI detector, PMMA conversion <Preform, Molding of Bottle>

In Examples, molding was performed as follows.

Molding machine: SBIII-100H-15, double screw stretch bottle molding machine manufactured by Aoki Technical Laboratory, Inc.

Temperature of cylinder: 280° C.
Temperature of hot runner nozzle: 290° C.
Injection pressure: 140 kg/cm$^2$
Temperature of mold: water cool
Weight of preform: 24 g
Content of bottle: 500 mL <Dehydration and Crystallization of Recycled Pet Resin>

A bottle molded article made of PET was washed, shattered by a shattering machine, and dried by a hot-air dryer at 120° C. for 12 hours. The shattered material was then transferred to a vacuum dryer, replaced with nitrogen, and crystallized at 180° C. for 6 hours.

<Supply of Recovered Pet Resin to Polymerization Vessel>

A single screw extruder was attached to an inlet for recovered PET of the polymerization vessel shown in FIG. 1 so as to introduce the molten resin extruded from the extruder into the polymerization vessel by way of a pipe.

Example 1

Used bottles were recovered, washed and shattered. A molten resin of the shattered bottles having an intrinsic viscosity [η] of 0.65 dl/g and a crystal melting point of 255° C. was supplied to the polymerization vessel 1 from the raw material supply port 3 by the extruder. The molten resin while maintaining the molten state at 260° C. was ejected from the pores of the porous plate 4 at a rate of 20 g/minute per pore. The resultant resin was polymerized under reduced pressure of 105 Pa while dropping the resin along the support 6 in the atmosphere whose temperature was adjusted equal to the ejection temperature. Thereafter, the resin was discharged by the discharge pump 9, fed through the transport pipe and the distributor 10, to a double screw stretch blow molding machine. As a result, a hollow product was obtained. The porous plate used herein had a thickness of 50 mm and 1 mm-diameter pores linearly arranged at 25 mm intervals in 0.4 lines. The support 6 was a metal grid prepared by attaching wire filaments (2 mm in diameter and 8 m in length) each to a portion of the porous plate in a close proximity of each pore so as to vertically hang down, and then arranging wire filaments (2 mm in diameter and 100 mm in length) at 15 mm intervals so as to cross with the wire filaments mentioned above at right angles. As the material of the support 6, stainless steel was used. The discharge pump 9 was operated while monitoring the resin through the observation window 5 so as to accumulate little or nothing of the resin on the bottom of the polymerization vessel. The retaining time of the resin in this case was 60 minutes. Note that the retaining time was calculated by dividing the amount of the resin present inside the polymerization vessel by the supply amount of the resin. In this Example, as a molding machine, a double screw stretch blow-molding machine manufactured by AOKI Technical Laboratory, Inc. was used alone without other molding machines and the resin was discharged. A preform formation step to a hollow product formation step were continuously performed in the molding conditions: the temperature of a resin: 280° C., the temperature of a mold: 90° C. at a core side, 130° C. at the upper side near a cavity, 50° C. at the lower side, the injection time: 7 seconds, the cooling time: 3 seconds, and the time required for one cycle: 18 seconds. The results are shown in Table 1. A prepolymer was appropriately foamed in the polymerization vessel. The obtained molded article exhibited a high polymerization degree, good color tone, and a less acetaldehyde content. Hence, a high-quality hollow product made of PET with a high polymerization degree was obtained.

Example 2

Polymerization and molding were performed in the same manner as in Example 1 except that EG was introduced at a rate of 5 ml/min from a liquid addition apparatus of the extruder and the conditions shown in Table 1 were employed. The results are shown in Table 1. The prepolymer in the polymerization vessel was appropriately foamed. The obtained molded article exhibited a high polymerization degree, good color tone, and a less acetaldehyde content. Hence, a high-quality hollow product made of PET with a high polymerization degree was obtained.

Examples 3 to 5

Polymerization and molding were performed in the same manner as in Example 1 except that support structures shown in Table 2 were employed. The results are shown in Table 1. The obtained molded article exhibited a high polymerization degree, good color tone, and a less acetaldehyde content. Hence, a high-quality hollow product made of PET with a high polymerization degree was obtained.

Example 6

Polymerization was performed in the same manner as in Example 1 except that the conditions shown in Table 1 were employed.

A strand was stretched through water and palletized by a pelletizer to obtain pellets. The results were shown in Table 1. The obtained pellets exhibited a higher polymerization degree than the recovered product, better color tone, and a less acetaldehyde content. Hence, a high-quality PET resin pellets were obtained.

Examples 7 and 8

Polymerization and palletizing were performed in the same manner as in Example 6 except that nitrogen was introduced as shown in Table 1. The results are shown in Table 1. In this case, a high-viscosity PET resin pellets were obtained with good color tone and in a less acetaldehyde content.

Comparative Example 1

Bottles were washed, shattered, dried and crystallized and thereafter, directly subjected to double screw stretch blow molding. The results are shown in Table 1. In Comparative Example 1, it was difficult to mold a bottle since the drawdown of a preform was significant due to a reduction of molecular weight.

Comparative Example 2

Polymerization and molding were performed in the same manner as in Example 1 except that transverse double screw polymerization vessel having a disk-form stirring vanes was used as a polymerization vessel and the polymerization was performed at 290° C. Note that the resin retaining time in the polymerization vessel was 2 hours. The results are shown in Table 1. It was difficult to obtain a recycled polymer having a high polymerization degree. The obtained hollow molded article was colored yellow and had a large acetaldehyde content.

Comparative Examples 3 to 5

Bottles were washed, shattered and subjected to polymerization performed in the same manner as in Example 1 except that the conditions shown in Table 1 were employed. The results are shown in Table 1. In Comparative Example 3, the molded article was colored yellow since the polymerization temperature was excessively high and showed a high acetaldehyde content. In Comparative Example 4, the resin was solidified since the polymerization temperature was excessively low, and thus no polymerization was performed. In Comparative Example 5, polymerization failed to proceed and decomposition took place. As a result, the viscosity of a resin decreased.

TABLE 1

| | | Recovered products (after dehydration, crystallization) | | | Polymerization condition | | | |
|---|---|---|---|---|---|---|---|---|
| | | | Amount of | | | | | |
| | Material | Intrinsic viscosity (dl/g) | carboxyl group (meq/kg) | Crystal melting temperature (° C.) | Support structure | Polymerization rate (kg/h) | Temperature (° C.) | Pressure (Pa) |
| Example 1 | Bottle | 0.65 | 40 | 255 | 1 | 6.0 | 255 | 105 |
| Example 2 | Bottle | 0.65 | 40 | 255 | 1 | 6.0 | 255 | 65 |
| Example 3 | Bottle | 0.65 | 41 | 255 | 2 | 8.0 | 255 | 105 |
| Example 4 | Bottle | 0.65 | 42 | 255 | 3 | 8.0 | 255 | 105 |
| Example 5 | Bottle | 0.65 | 43 | 255 | 4 | 8.0 | 255 | 105 |
| Example 6 | Bottle | 0.65 | 40 | 255 | 1 | 6.0 | 260 | 65 |
| Example 7 | Bottle | 0.65 | 40 | 255 | 1 | 6.0 | 260 | 100 |
| Example 8 | Bottle | 0.65 | 40 | 255 | 1 | 6.0 | 255 | 65 |
| Comparative Example 1 | Bottle | 0.65 | 40 | 255 | — | — | — | — |
| Comparative Example 2 | Bottle | 0.65 | 40 | 255 | — | — | 290† | 60 |
| Comparative Example 3 | Bottle | 0.65 | 41 | 255 | 1 | 6.0 | 340 | 65 |
| Comparative Example 4 | Bottle | 0.65 | 42 | 255 | 1 | 6.0 | 240 | 65 |
| Comparative Example 5 | Bottle | 0.65 | 43 | 255 | 1 | 6.0 | 255 | Normal pressure |

| | Polymerization condition | | | Properties of molded article | | | | | |
|---|---|---|---|---|---|---|---|---|---|
| | Nitrogen (mg/g) | Foaming state | Smearing state | Intrinsic viscosity (dl/g) | Amount of carboxyl group (meq/kg) | Acetaldehyde content (ppm) | Mw/Mn | Hue | |
| | | | | | | | | L Value | b Value |
| Example 1 | 0 | ○ | ○ | 0.82 | 42 | 5.8 | 2.1 | 97.6 | 0.51 |
| Example 2 | 0 | ○ | ○ | 0.80 | 48 | 7.2 | 2.0 | 97.8 | 0.50 |
| Example 3 | 0 | ○ | ○ | 0.81 | 43 | 6.9 | 2.1 | 97.7 | 0.50 |
| Example 4 | 0 | ○ | ○ | 0.82 | 50 | 6.5 | 2.1 | 97.7 | 0.49 |
| Example 5 | 0 | ○ | ○ | 0.82 | 42 | 6.3 | 2.0 | 97.6 | 0.48 |
| Example 6 | 0 | ○ | ○ | 0.98 | 65 | 6.8 | 2.1 | 97.2 | 0.52 |
| Example 7 | 5 | ○ | ○ | 1.08 | 62 | 6.9 | 2.0 | 97.0 | 0.58 |
| Example 8 | 0.5 | ○ | ○ | 0.88 | 37 | 8.2 | 2.0 | 97.5 | 0.50 |
| Comparative Example 1 | — | — | — | 0.50 | 120 | 5.9 | 2.5 | 97.6 | 0.52 |
| Comparative Example 2 | — | — | — | 0.64 | 145 | 85 | 2.1 | 92.1 | 1.89 |
| Comparative Example 3 | 0 | X | X | 0.68 | 152 | 129 | 2.2 | 92.6 | 1.76 |
| Comparative Example 4 | 0 | — | — | — | — | — | — | — | — |
| Comparative Example 5 | 0 | None | ○ | 0.41 | 130 | 125 | 2.6 | 97.5 | 0.50 |

†: Molten polymerization temperature in transverse double screw polymerization vessel.

TABLE 2

| | | Longitudinal side | | | | Lateral side | | |
|---|---|---|---|---|---|---|---|---|
| | Shape of support | Filament diameter (mm) | Length (m) | Number of filaments (filament) | Arrangement intervals (mm) | Filament Diameter (mm) | Length (mm) | Arrangement intervals (mm) |
| Support 1 | Lattice | 2 | 8.0 | 4 | 25 | 2 | 100 | 15 |
| Support 2 | Lattice | 3 | 8.0 | 4 | 50 × 50 | 3 | 30 | 30 |
| Support 3 | Chain | 3 | 8.0 | 4 | 50 × 50 | — | — | — |
| Support 4 | Wire | 5 | 8.0 | 4 | 50 × 50 | — | — | — |

INDUSTRIAL APPLICABILITY

According to the present invention, it is possible to increase polymerization degree of a recovered polycondensation polymer with good productivity at low cost while maintaining high quality. Therefore, the present invention can be suitably applied as a material recycling technique.

The invention claimed is:

1. A process for recycling recovered polycondensation polymer products, comprising
supplying a recovered polycondensation polymer in a molten state having a changing input viscosity to a polymerization vessel having a porous plate,
ejecting the recovered polycondensation polymer through pores of the porous plate,
dropping the recovered polycondensation polymer through the polymerization vessel along a support, and
increasing a polymerization degree of the recovered polycondensation polymer in the polymerization vessel under reduced pressure or in an inert gas atmosphere under reduced pressure; wherein
melt viscosity of the recovered polycondensation polymer is continuously measured as the recovered polycondensation polymer is being supplied to the polymerization vessel,
the reduced pressure in the polymerization vessel is continuously adjusted based on the melt viscosity to accommodate the changing input viscosity of the recovered polycondensation polymer, and
the melt viscosity is measured upstream from the polymerization vessel.

2. The process according to claim 1, wherein
the recovered polycondensation polymer is supplied to the polymerization vessel as a mixture of the recovered polycondensation polymer and an unused polycondensation polymer and/or an intermediate polymer, and
the mixture is ejected from the pores of the porous plate.

3. The process according to claim 1, wherein the recovered polycondensation polymer has a number average molecular weight of 20,000 to 100,000 after increasing the polymerization degree.

4. The process according to claim 1, wherein impurities are filtered out with a filter positioned at an upstream side of the porous plate in a channel for the molten-state of the recovered polycondensation polymer.

5. The process according to claim 1, wherein
the recovered polycondensation polymer is supplied to the polymerization vessel alone or as a mixture of the recovered polycondensation polymer and an unused polycondensation polymer and/or an intermediate polymer,
the process further comprises reacting the recovered polycondensation polymer or the mixture with a molecular weight adjuster, prior to supplying the recovered polycondensation polymer or the mixture to the polymerization vessel.

6. The process according to claim 1, wherein the recovered polycondensation polymer is a recovered polyethylene terephthalate resin and ejected from the pores of the porous plate at a temperature ranging from "a crystal melting temperature−10° C." to "the crystal melting temperature+60° C.".

7. A process for producing a molded article, characterized by comprising transferring the polymer recycled by the process according to claim 1 to a molding machine in a molten state and molding the polymer.

8. The process according to claim 2, wherein the recovered polycondensation polymer has a number average molecular weight of 20,000 to 100,000 after increasing the polymerization degree.

9. The process according to claim 2, wherein impurities are filtered out with a filter positioned at an upstream side of the porous plate in a channel for the molten-state of the recovered polycondensation polymer.

10. The process according to claim 8, wherein impurities are filtered out with a filter positioned at an upstream side of the porous plate in a channel for the molten-state of the recovered polycondensation polymer.

11. The process according to claim 2, wherein
the recovered polycondensation polymer is supplied to the polymerization vessel alone or as a mixture of the recovered polycondensation polymer and an unused polycondensation polymer and/or an intermediate polymer,
the process further comprises reacting the recovered polycondensation polymer or the mixture with a molecular weight adjuster, prior to supplying the recovered polycondensation polymer or the mixture to the polymerization vessel.

12. The process according to claim 3, wherein
the recovered polycondensation polymer is supplied to the polymerization vessel alone or as a mixture of the recovered polycondensation polymer and an unused polycondensation polymer and/or an intermediate polymer,
the process further comprises reacting the recovered polycondensation polymer or the mixture with a molecular weight adjuster, prior to supplying the recovered polycondensation polymer or the mixture to the polymerization vessel.

13. The process according to claim 10, wherein
the recovered polycondensation polymer is supplied to the polymerization vessel alone or as a mixture of the recovered polycondensation polymer and an unused polycondensation polymer and/or an intermediate polymer,
the process further comprises reacting the recovered polycondensation polymer or the mixture with a molecular weight adjuster, prior to supplying the recovered polycondensation polymer or the mixture to the polymerization vessel.

14. The process according to claim 2, wherein the recovered polycondensation polymer is a recovered polyethylene terephthalate resin and ejected from the pores of the porous plate at a temperature ranging from "a crystal melting temperature−10° C." to "the crystal melting temperature+60°C.".

15. The process according to claim 3, wherein the recovered polycondensation polymer is a recovered polyethylene terephthalate resin and ejected from the pores of the porous plate at a temperature ranging from "a crystal melting temperature−10° C." to "the crystal melting temperature+60°C.".

16. The process according to claim 4, wherein the recovered polycondensation polymer is a recovered polyethylene terephthalate resin and ejected from the pores of the porous plate at a temperature ranging from "a crystal melting temperature−10° C." to "the crystal melting temperature+60°C.".

17. The process according to claim 13, wherein the recovered polycondensation polymer is a recovered polyethylene terephthalate resin and ejected from the pores of the porous plate at a temperature ranging from "a crystal melting temperature−10° C." to "the crystal melting temperature+60°C.".

18. A process for producing a molded article, characterized by comprising transferring the polymer recycled by the process according to claim 2 to a molding machine in a molten state and molding the polymer.

19. A process for producing a molded article, characterized by comprising transferring the polymer recycled by the process according to claim 3 to a molding machine in a molten state and molding the polymer.

20. A process for producing a molded article, characterized by comprising transferring the polymer recycled by the process according to claim 4 to a molding machine in a molten state and molding the polymer.

21. A process for producing a molded article, characterized by comprising transferring the polymer recycled by the process according to claim 5 to a molding machine in a molten state and molding the polymer.

22. A process for producing a molded article, characterized by comprising transferring the polymer recycled by the process according to claim 17 to a molding machine in a molten state and molding the polymer.

23. A process for recycling recovered polycondensation polymer products, comprising supplying the recovered polycondensation polymer in a molten state having a changing input viscosity to a polymerization vessel having a porous plate, ejecting the recovered polycondensation polymer through pores of the porous plate, dropping the recovered polycondensation polymer through the polymerization vessel along a support, and increasing a polymerization degree of the recovered polycondensation polymer in the polymerization vessel under reduced pressure or in an inert gas atmosphere under reduced pressure; wherein melt viscosity of the recovered polycondensation polymer is continuously measured as the recovered polycondensation polymer is being supplied to the polymerization vessel, the reduced pressure in the polymerization vessel is continuously adjusted based on the melt viscosity to accommodate the changing input viscosity of the recovered polycondensation polymer, the melt viscosity is measured upstream from the polymerization vessel, and a polycondensation reaction side-product is exhausted from an exhausting port in the polymerization vessel for reducing pressure.

24. The process according to claim 1, wherein the recovered polycondensation polymer products comprise at least one of waste polymer products and defective polymer products.

25. The process according to claim 1, wherein the recovered polycondensation polymer is subjected to a crystallization process before being supplied to the polymerization vessel.

* * * * *